United States Patent
Rotstein

Patent Number: 6,116,166
Date of Patent: Sep. 12, 2000

[54] CHILD'S COLLAPSIBLE TRAVEL TRAY

[76] Inventor: Gali Rotstein, 7519 Woodman Pl., Van Nuys, Calif. 91405

[21] Appl. No.: 09/037,709
[22] Filed: Mar. 10, 1998

Related U.S. Application Data

[60] Provisional application No. 60/036,687, Mar. 12, 1997.
[51] Int. Cl.⁷ ..................................................... A47D 15/00
[52] U.S. Cl. ............................ 108/43; 108/135; 224/270
[58] Field of Search .......................... 297/182, 4, 188.01; 220/17.1; 224/270, 275; 2/48; 108/43, 44, 46, 42, 134, 135, 151, 152; 5/99.1, 655; 190/11, 2

[56] References Cited

U.S. PATENT DOCUMENTS

| | | | |
|---|---|---|---|
| 2,265,690 | 12/1941 | Fiedler | 2/48 |
| 3,115,639 | 12/1963 | Moszczynski | 2/48 |
| 3,492,680 | 2/1970 | Collidge | 5/99.1 |
| 4,466,659 | 8/1984 | Carpentier et al. | 224/275 X |
| 4,770,107 | 9/1988 | Miller | 108/44 |
| 5,107,545 | 4/1992 | Potter | 2/48 X |
| 5,188,421 | 2/1993 | Arseneault | 297/182 |
| 5,224,637 | 7/1993 | Colombo | 5/655 X |
| 5,379,469 | 1/1995 | Millis et al. | 297/188.01 X |
| 5,473,785 | 12/1995 | Lager et al. | 5/655 |
| 5,642,674 | 7/1997 | Joye, Sr. et al. | 108/43 |

*Primary Examiner*—Peter M. Cuomo
*Assistant Examiner*—Janet M. Wilkens
*Attorney, Agent, or Firm*—H. Michael Brucker

[57] ABSTRACT

A fully collapsible child's travel tray that fits closely to the child to prevent playthings or food from falling into the child's lap or to the floor of a vehicle in which the child is riding and restrained. The tray includes a bottom member and upstanding side walls, all of which include a rigid member encapsulated by a waterproof membrane. Hinges are formed in the bottom member and the upstanding walls to allow the tray to be collapsed and folded to a relatively small configuration for convenient storage. The tray includes a strap extending from the upstanding walls and sized to extend about the waist of a child and including a fastener to fasten the open ends of the strap about the child's waist.

19 Claims, 8 Drawing Sheets

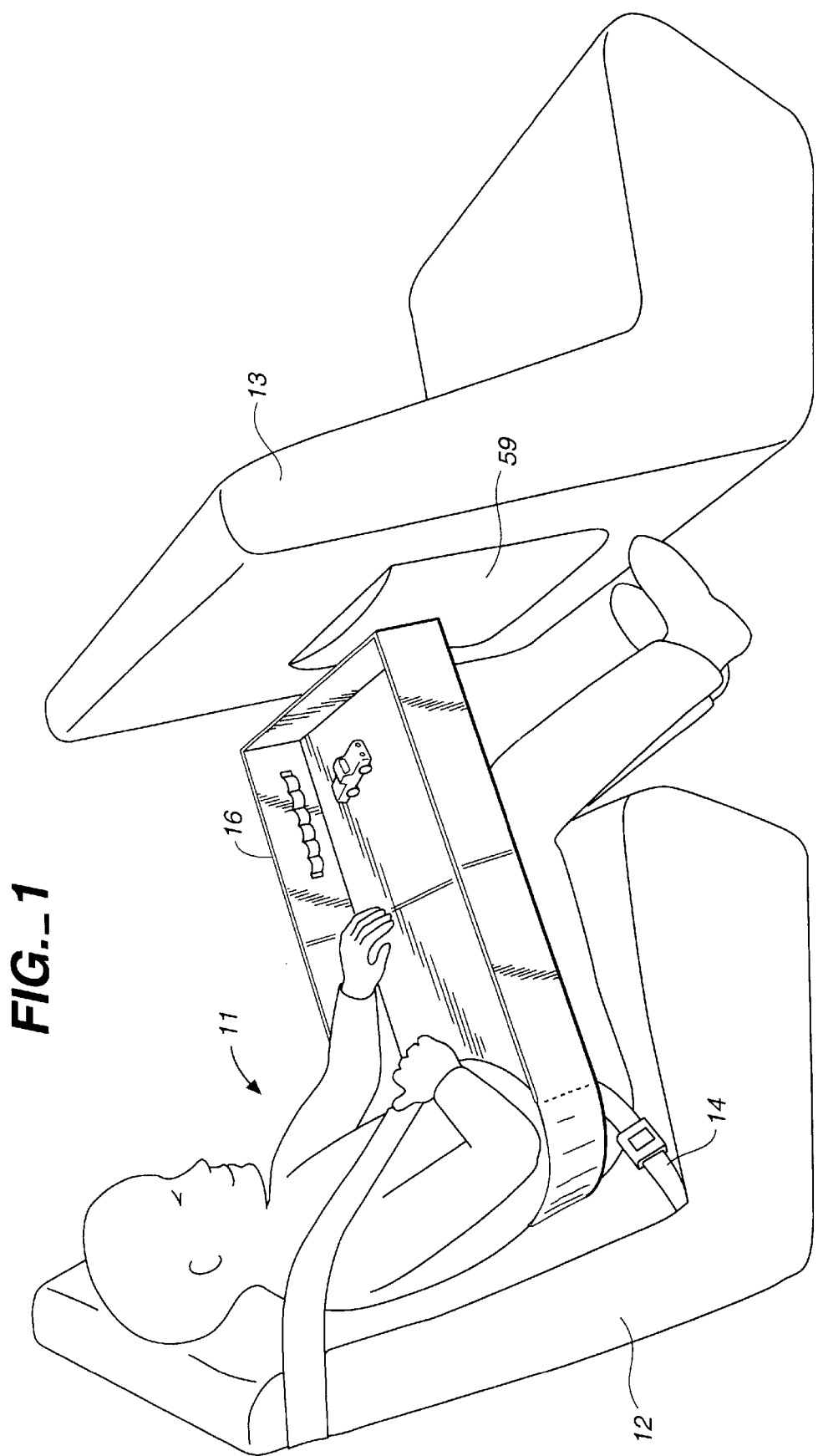

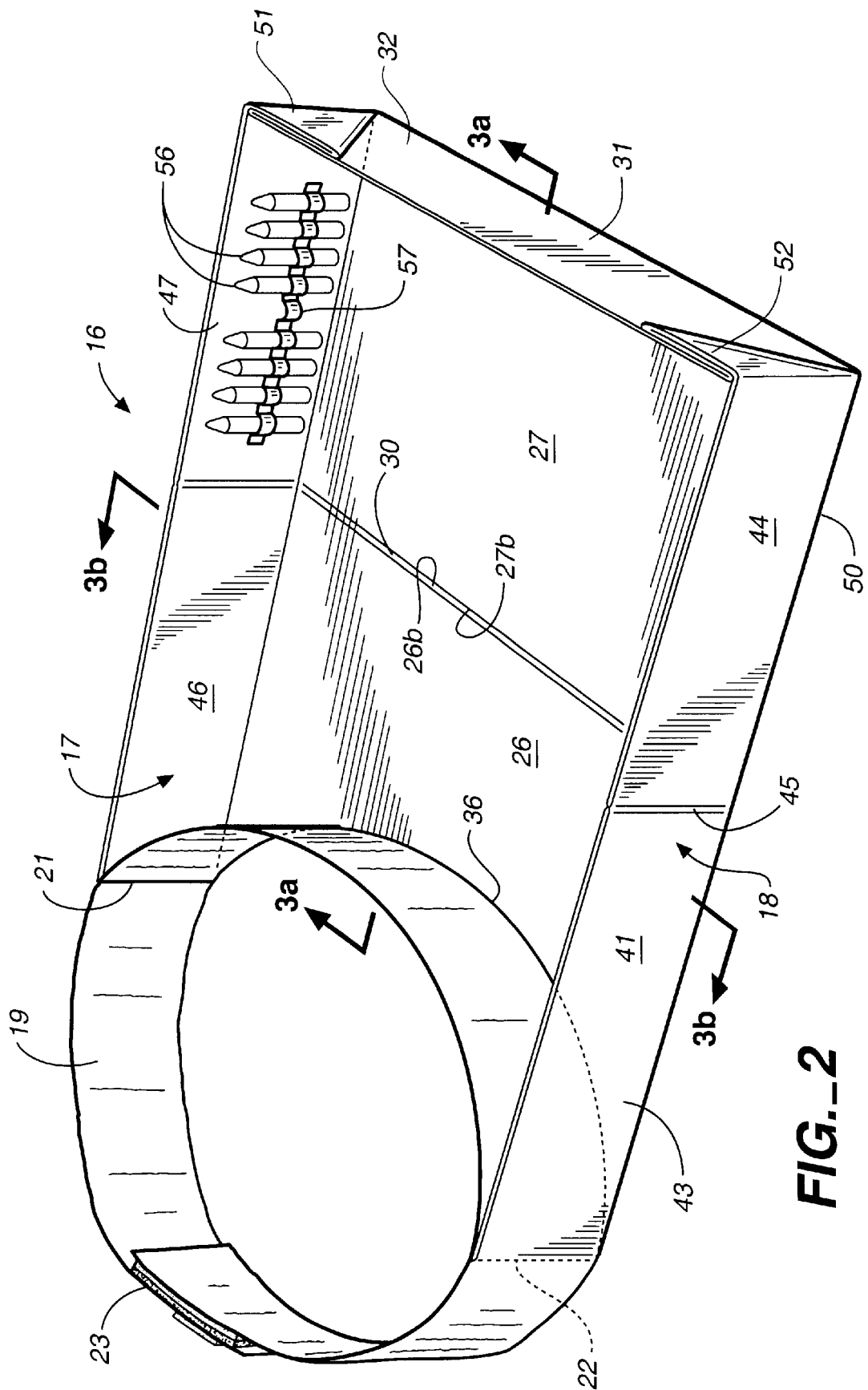
FIG._2

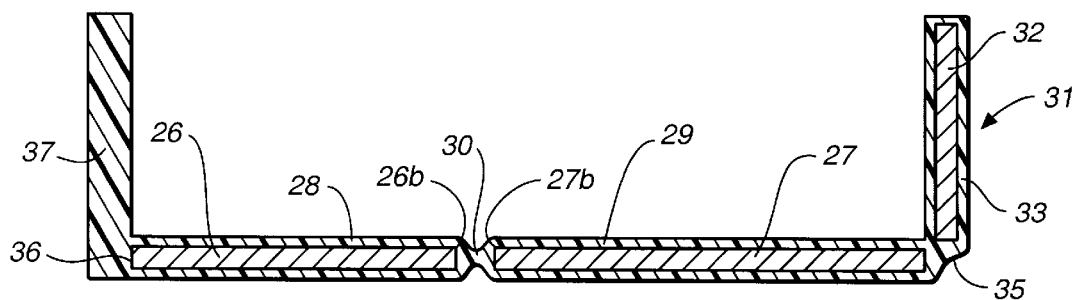
FIG._3a
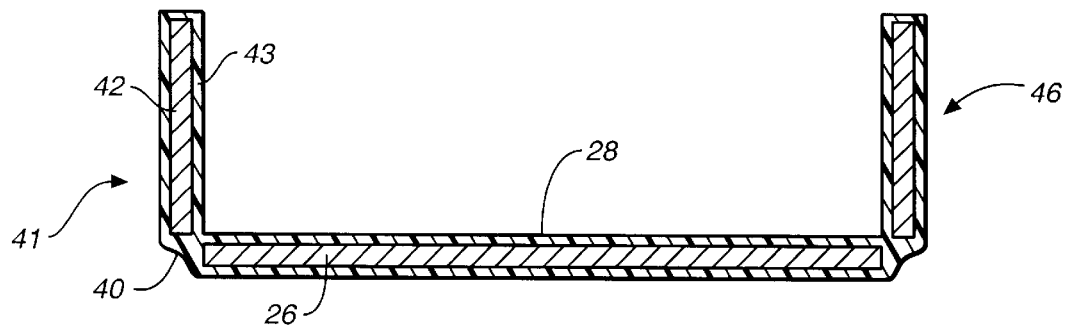
FIG._3b

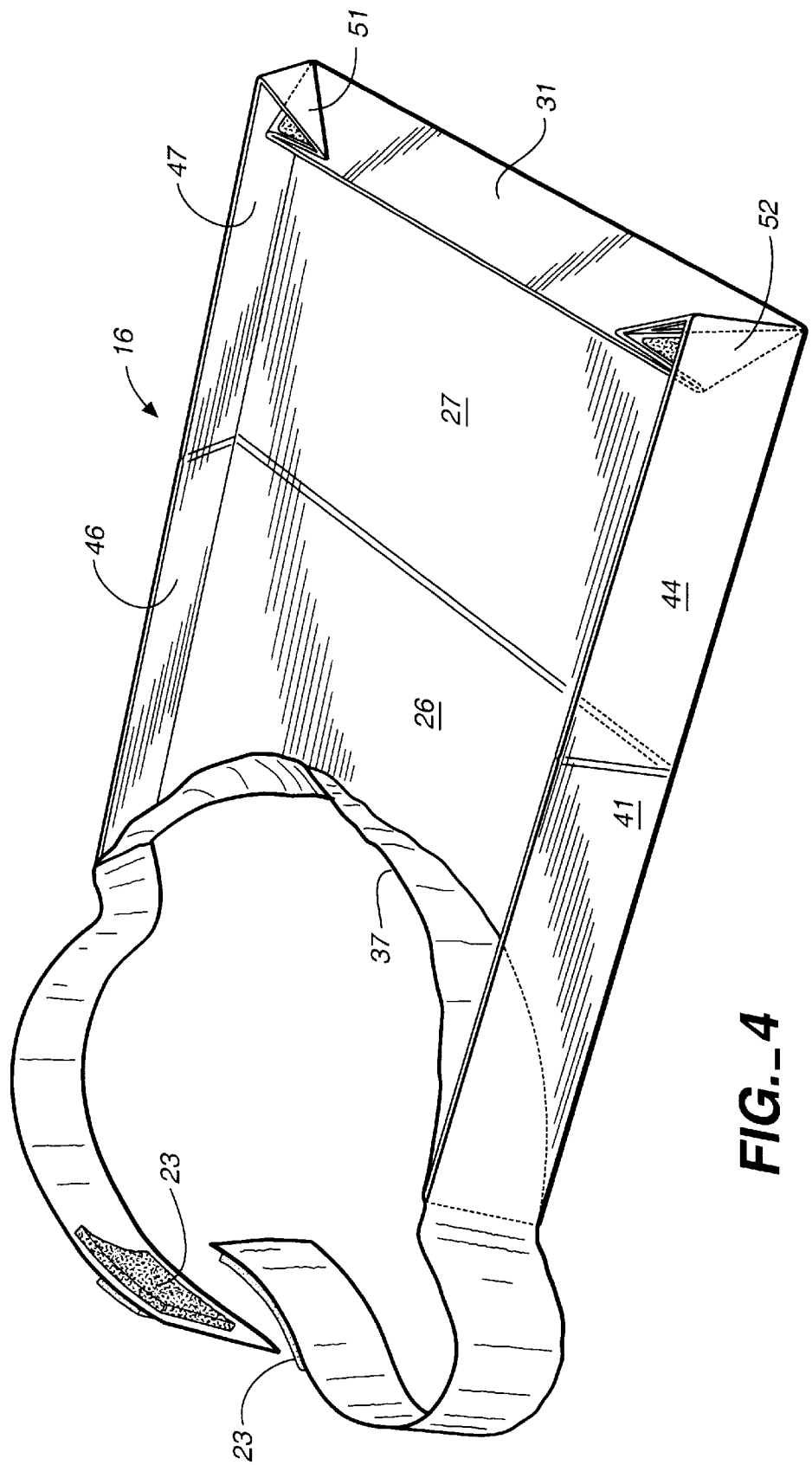
FIG._4

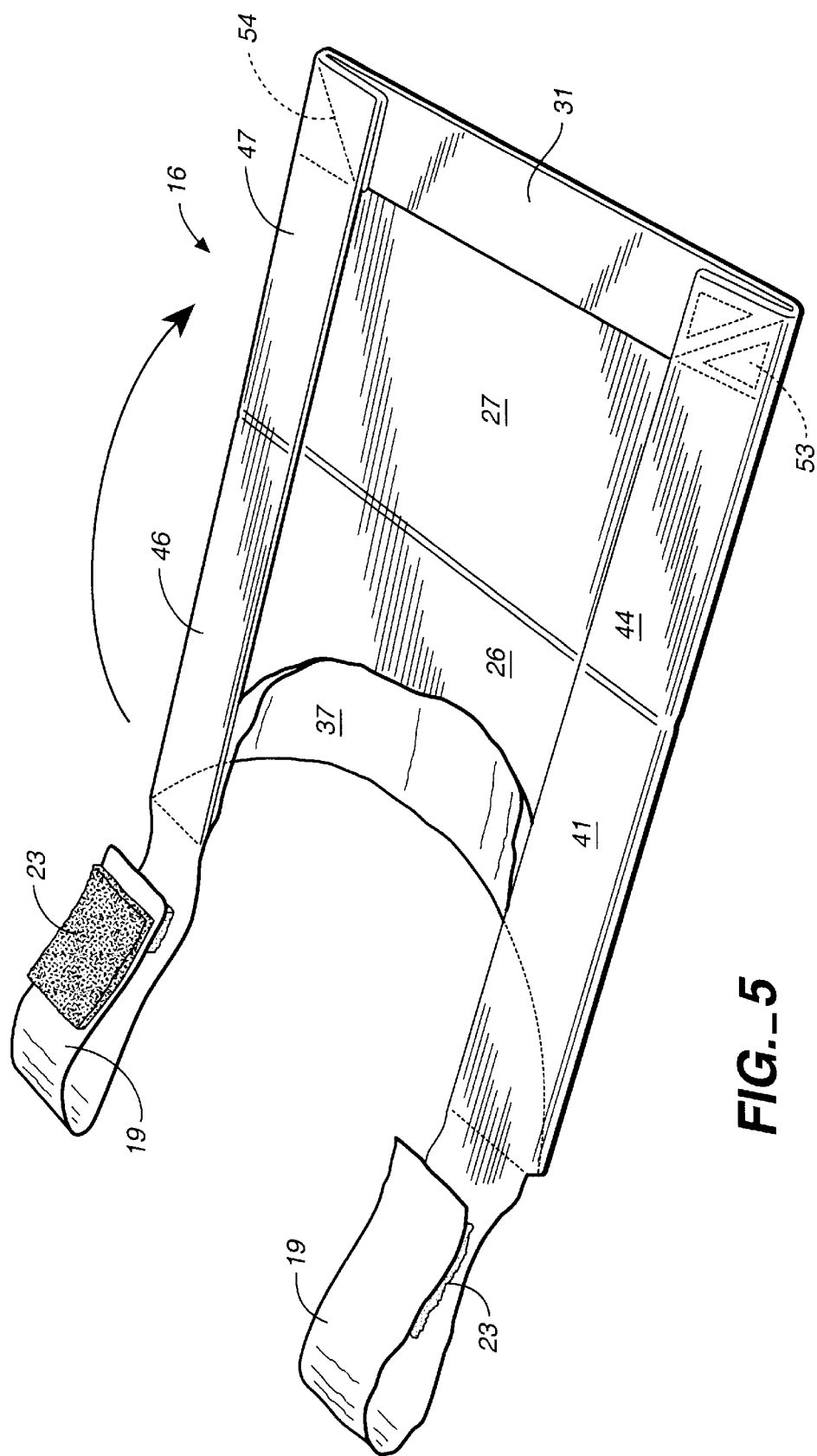
FIG._5

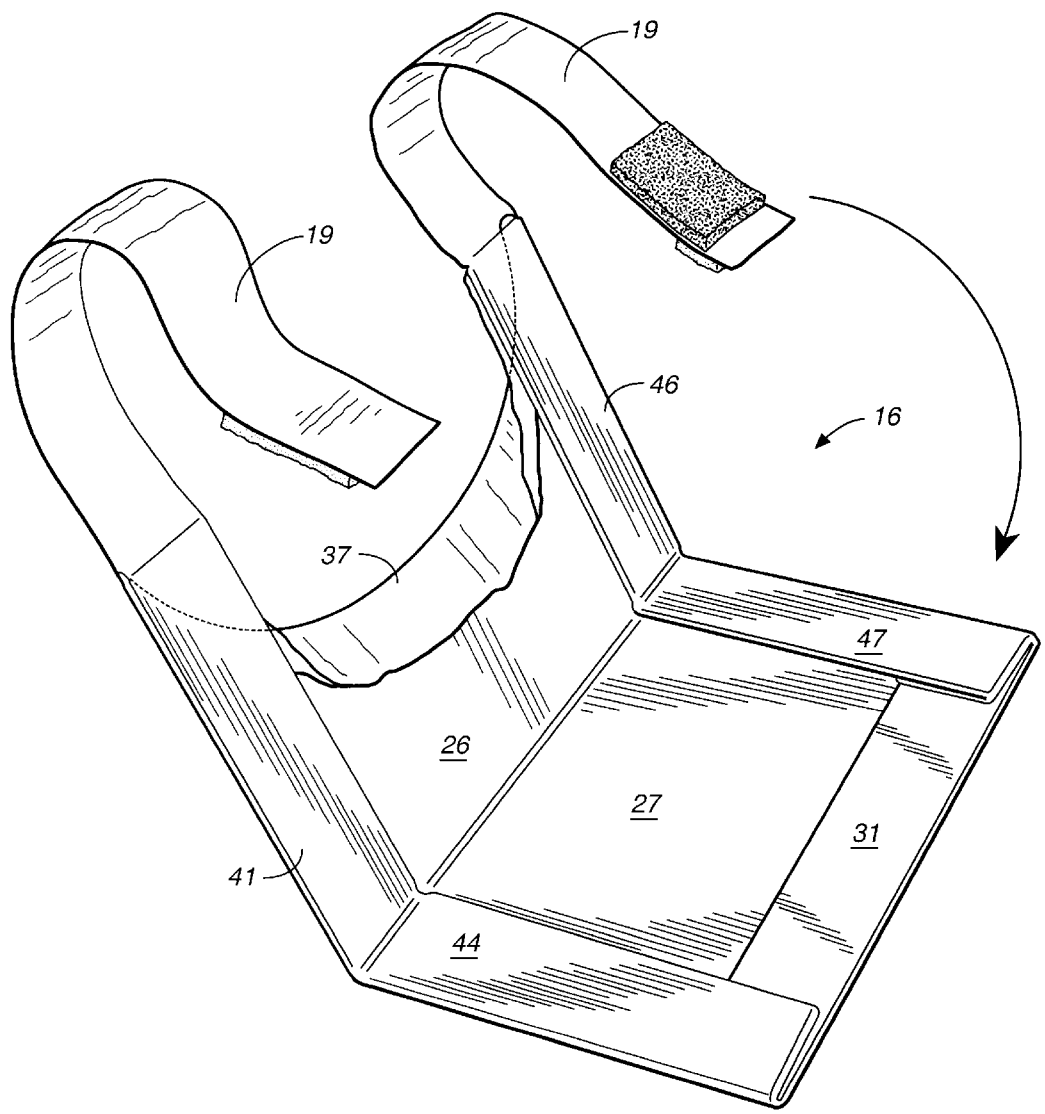
FIG._6

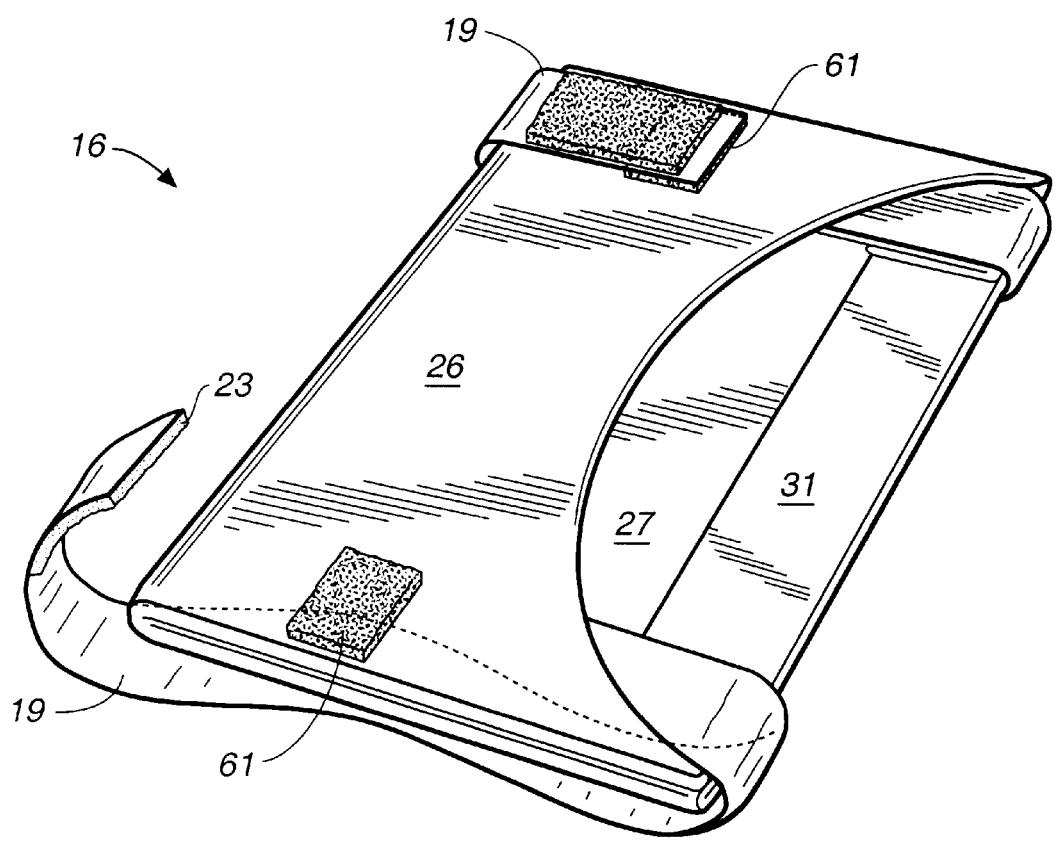
FIG._7

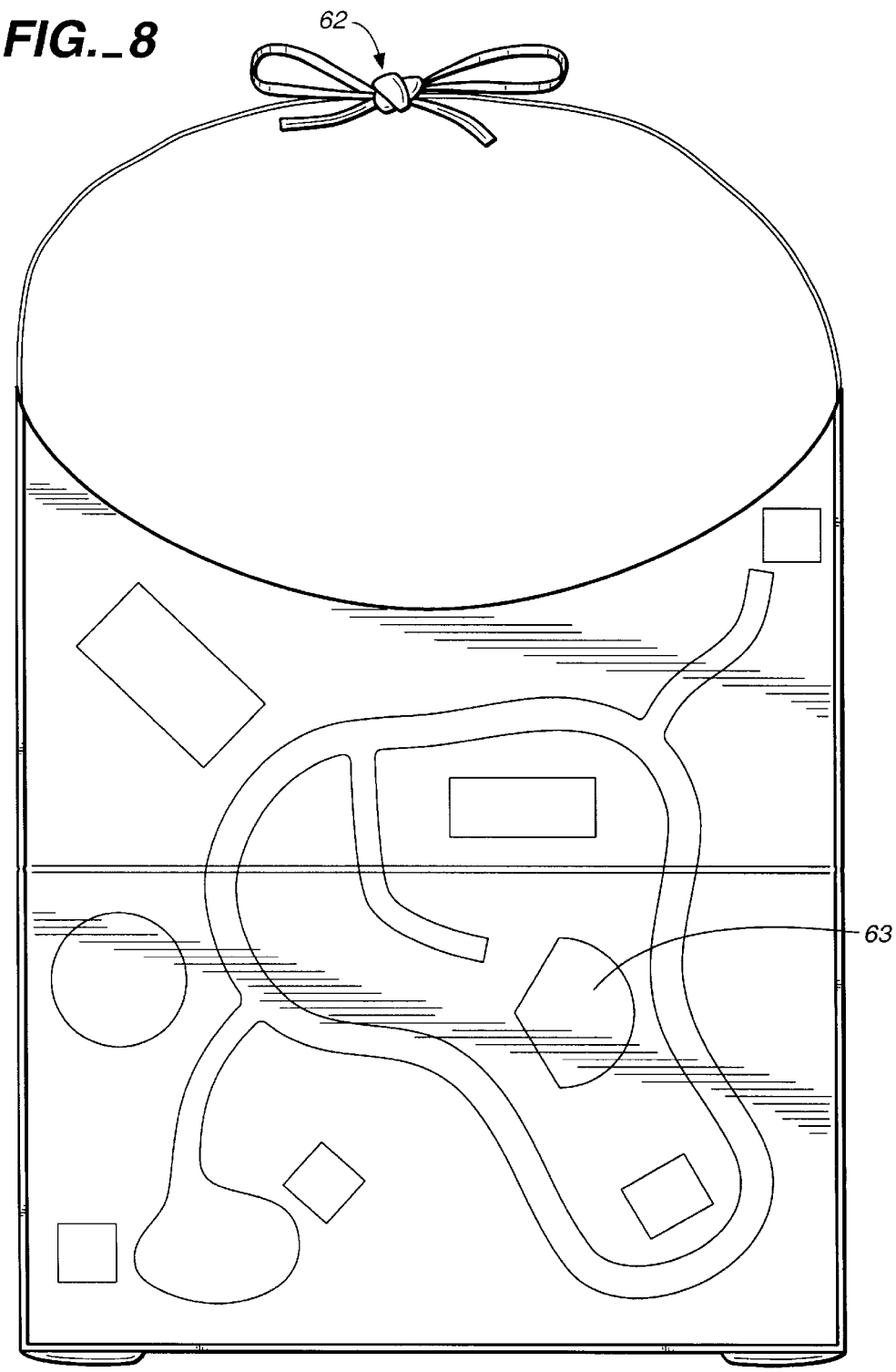
FIG._8

CHILD'S COLLAPSIBLE TRAVEL TRAY

BACKGROUND OF THE INVENTION

This application is based upon provisional application 60/036,687, filed Mar. 12, 1997, and from which priority is claimed.

The present invention relates to a travel accessory for use with small children, and in particular, to a collapsible travel tray particularly suited for assisting children when seated, such as in an airplane or automobile. The travel tray of the present invention which, when not in use, collapses into a convenient and easily carried package, provides a convenient and secure area for a child to play, and prevents toys or food from being easily spilled or dropped outside of the confines of the tray.

Anyone who has traveled with a small child on an airplane or in an automobile where they are required to be secured by seat restraints knows that a constant problem concerns the retrieval of toys, food or other items which invariably drop from the hands or lap of the secured child onto the floor below. In the cramped quarters of an airplane or an automobile, retrieving such lost items (which most children require be retrieved instantaneously) often poses a daunting physical challenge for the adults accompanying the children. It is with this problem in mind that the present invention was developed.

SUMMARY OF THE INVENTION

The present invention provides an elegant solution to the problem of keeping food and play items within easy reach of a child while they are traveling, and at the same time, provides other advantages and benefits as will be described more fully below.

In general, the present invention comprises a tray having a segmented, rigid, flat, rectangular bottom member surrounded on all sides by an upstanding restraining wall and a securing means for attaching the tray to the user's waist while, at the same time, securing a portion of the upstanding wall member firmly against the child's body.

In the preferred embodiment, the rectangular bottom member and upstanding wall members surrounding the rectangular bottom member are made of a rigid material encapsulated by a waterproof membrane material such as vinyl plastic. The securing means includes a wall member made entirely of the membrane material so that it is sufficiently resilient and flexible to enable it to adapt to children of diverse dimensions.

The rectangular bottom member and the wall members are suitably provided with hinges allowing the inventive tray to be collapsed to a small size for convenient storage.

Accordingly, it is a first object of the present invention to provide a child's collapsible travel tray.

It is a further object of the present invention to provide such a device wherein a bottom member and walls thereof are encapsulated in a waterproof material.

It is still a further object of the present invention to provide such a device wherein the bottom member and the walls include hinges allowing the device to be folded and collapsed to a small size for convenient storage.

These and other objects, aspects and features of the present invention will be better understood from the following detailed description of the preferred embodiments when read in conjunction with the appended drawing figures.

BRIEF DESCRIPTION OF THE DRAWINGS

The invention is illustrated in the following figures:

FIG. 1 is a perspective view of the tray of the present invention shown in use with a child seated and restrained;

FIG. 2 is a perspective view of the tray of the present invention erected for use;

FIG. 3a is a cross-sectional elevation view taken along line 3a—3a of FIG. 2;

FIG. 3b is a cross-sectional elevation view taken along line 3b—3b of FIG. 2;

FIG. 4 is a perspective view of the tray of FIG. 2 in its initial stage of being collapsed;

FIG. 5 is a perspective view of the tray of FIG. 4 in which the upstanding members have been completely collapsed;

FIG. 6 is a perspective view of the tray of FIG. 5 in the initial stages of being folded into a convenient package;

FIG. 7 is a perspective view of the invention of FIG. 6 showing the invention fully collapsed, folded and secured into a convenient carrying package; and FIG. 8 is a plan view of an alternative embodiment of the invention.

SPECIFIC DESCRIPTION OF THE PREFERRED EMBODIMENTS

Referring to the drawings, and in particular, FIGS. 1, 2, 3a and 3b, a child 11 is seated in a seat 12 behind another seat 13 representing the situation which exists when a child is seated in an automobile or airplane and restrained by seat belts 14. The travel tray 16 of the present invention is attached to the child 11 and extends from the child's waist to the back of the seat 13 in front of the child. Although not shown, the child's seat 12 may include armrests (not shown on one or both sides of the seat 12, so the tray 16 is sized to fit between any such armrests which may be present.

With reference to FIG. 2, the travel tray 16 comprises a flat segmented bottom member 17 completely surrounded by upstanding wall member 18 which forms a contiguous and, in the preferred embodiment, water-tight seal with the bottom member 17. A strap 19 extends from the ends 21 and 22 of upstanding wall 18 and includes a securing means 23, such as a "VELCRO"-brand hook and pile fastening means or the like.

Bottom member 17 comprises a plurality (in the embodiment illustrated, two) of separate rigid floor members 26 and 27 which are separately encapsulated within respective membranes 28 and 29 (FIGS. 3a and 3b). The membranes 28 and 29 (and additional membranes described below) are preferably made of an easily cleanable and waterproof material such as vinyl, which is durable, flexible and non-toxic. The adjacent ends 26b and 27b of floor members 26 and 27, respectively, are joined by their respective membranes 28 and 29 to form a hinge 30. By having a plurality of floor members 26 and 27 which are hingedly connected, the floor members 26 and 27 are capable of being folded, one on top of the other, so as to make the tray 16 collapsible into a more conveniently carried package, as will be more fully described below.

The upstanding wall 18 comprises six separate segmented members, as will be described more fully below, all of which are connected to form a contiguous enclosure with the bottom floor members 26 and 27.

The distal end wall 31 includes a rigid end wall forming member 32 which, like floor members 26a and 27a, is encapsulated within a membrane 33 (FIG. 3a) (which, as pointed out above, can advantageously be of vinyl or some other material which is waterproof, easily cleaned and nontoxic, as well as durable). Depending on construction techniques employed, the membranes 28, 29 and 33 can be contiguous. By virtue of the distal end wall member 32 being separate from the bottom members 26 and 27 and connected thereto by membrane junction 35 (FIG. 3a) which forms a hinge, end wall 32 can be folded over bottom member 27 to permit the travel tray of the present invention to be collapsed into a more conveniently carried package.

Whereas the floor member 27 immediately adjacent the distal end member 31 is generally rectangular, the floor member 26, which is designed to be disposed against the user's body, has an arcuate proximate edge 36 designed to receive a child's midsection when the tray 16 is fitted to child 11. An upstanding, proximal wall member 37 is attached along the entire perimeter of the arcuate edge 36 and can be advantageously formed from the same membrane material (FIG. 3a) that forms membrane 28 and contiguous therewith whereby the juncture of wall member 37 and the proximate edge 36 of floor member 26 is watertight. Unlike the distal wall member 31, which is formed by an encapsulated rigid end wall member 32, wall member 37 includes no rigid member, but is rather purposely maintained flexible so as to be able to follow the contours of the particular body to which it is attached. Because the proximal end wall member 37 can follow the contours of the body of the child 11 to which the invention is attached, it is less likely that food or toys can fall between the tray 16 (in particular, the end wall member 37) and the child.

The side wall members that connect the distal end wall member 31 and the proximal end wall member 37 are formed of the same number of members as form the floor 17, which, in the embodiment shown, is two.

Side wall member 41 extends along and is attached to one edge of floor member 26 and is attached at one of its ends 22 to the upstanding proximal end wall member 37. Side wall member 41 comprises a rectangular, rigid member 42 encapsulated by a membrane 43 of the characteristics previously described. The side wall member 41 and floor member 26 are attached by their respective encapsulating membranes to form a hinge 40. Side wall member 44, of the same construction as side wall member 41, is disposed along the same side edge of floor member 27. Floor member 27 and side wall member 44 are joined by their respective membranes to form hinge 50. Side wall members 41 and 44 are attached by their respective membranes to form hinge 45. By segmenting the side wall into separate, hingedly connected members 41 and 44, it is possible for the side wall to be collapsed and folded together with the floor members 26 and 27. On the other sides of floor members 26 and 27, side wall members 46 and 47 are also formed from encapsulated rigid, rectangular elements encapsulated in a vinyl material or the like, as described previously.

The joinder of side wall members 46 and 47 to each other, to floor members 26 and 27 and to end wall members 31 and 37 is substantially identical with the attachment to those same members to side wall members 41 and 44, as described in detail above.

The joinder of side wall members 44 and 47 to distal end wall member 31 is by gussets 51 and 52 which are formed by the materials that encapsulate the rigid inner elements of side wall members 44 and 47 and end wall member 31. The use of gussets 51 and 52 assures that the area defined by the tray remains waterproof so that spilled items (including liquids) can be restrained until they can be cleaned up.

Velcro securing elements 53 and 54 (see FIG. 5) secure the gussets 51 and 52 closed when the tray is erected so as to maintain the end wall 31 at essentially right angles to the floor member 37 and attached side wall members 44 and 47.

Play items such as crayons 56 can be secured to the inner sides of the side walls or end wall elements with brackets 57 shown in FIGS. 2 and 3.

Referring to FIGS. 4, 5, 6 and 7, the tray 16 of the present invention is fully collapsible when not in use and capable of being folded into a very neat and convenient package for carrying and storing such as in the back pocket of a seat such as pocket 59 shown in FIG. 1. With the velcro closure 23 released, the tray is easily and quickly detached from the child 11. By releasing the gussets 51 and 52, the distal end wall 31 can be folded onto the floor member 27 and the side wall segments 41, 44, 46 and 47 can then overlay both the distal end wall 31 and the adjacent floor members 26 and 27 (FIG. 5). The nonrigid proximal end wall 37 is easily folded onto floor member 26 (FIGS. 6–7) as the side wall members are folded onto the floor members. Once the end walls and side walls have been fully collapsed, the floor member 26 can be folded onto the floor member 27 (see FIG. 6) and the straps 19 extended over the distal end wall 31 and along the underside of floor element 27 and back onto floor element 26 where it is attached by a velcro closure 61 (FIG. 7).

When fully collapsed and secured, the travel tray 16 can be easily slid into a seat pocket or backpack for storage or transport.

Referring to FIG. 8, an alternative embodiment of the invention includes a tie closure 62 in place of the velcro closure 23.

By way of example of how the travel tray 16 can also be part of a game, FIG. 8 shows a graphic 63 applied to the floor members 26 and 27 which represents a possible game or activity for the child's entertainment.

The rigid members referred to above as being encapsulated to form floor members 26 and 27, distal end wall member 31 and side wall members 41, 44, 46 and 47 can be selected from a wide range of materials that are all capable of providing the rigidity needed to serve the invention. It is particularly advantageous if the floor members encapsulate a rigid material which is also heat-resistant so as to provide a layer of protection against injury to a child who may accidently spill a hot beverage.

As can be seen from the description above, the present invention provides a secure and convenient place for a child to play or eat while traveling and greatly reduces the number of dropped or spilled items that must be retrieved by an adult while the child is secured within the seat.

As such, an invention has been disclosed in terms of preferred embodiments thereof which fulfill each and every one of the objects of the invention as set forth herein above and provide a new and useful child's collapsible travel tray of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A travel tray comprising:

a) a bottom member having proximal and distal ends;

b) upstanding side walls surrounding a periphery of said bottom member and integrally attached thereto;

c) securing means extending continuously from said side walls for securing said tray about a waist of a user;

d) said securing means including a portion enclosing said proximal end of said bottom member and integrally attached to said side walls;

e) said bottom member and side walls having liquid repellent surfaces.

2. The tray of claim 1, wherein each of said bottom member and said side walls includes a rigid member encapsulated with a liquid repellent membrane, said membrane interconnecting said bottom member and side walls.

3. The tray of claim 2, wherein said portion of said securing means is entirely made of said membrane.

4. The tray of claim 2, wherein said bottom member is generally rectangular and includes a laterally extending hinge made of said membrane.

5. The tray of claim 4, further wherein said side walls lateral of said bottom member have respective hinges continuous with said bottom member hinge.

6. The tray of claim 5, further wherein said side wall at the distal end of said bottom member has lateral extremities connected to said lateral side walls with gussets.

7. The tray of claim 6, wherein a proximal edge of said bottom member is arcuate, said lateral side walls being foldable over said bottom member with said distal side wall being foldable over said lateral side walls, said bottom member and side walls being subsequently foldable about said hinges to collapse said tray to a relatively small size for storage.

8. The tray of claim 4, wherein a proximal edge of said bottom member is arcuate.

9. The tray of claim 8, wherein said portion of said securing means is entirely made of said membrane.

10. The tray of claim 9, wherein said portion of said securing means is arcuate corresponding to said proximal edge.

11. The tray of claim 2, wherein said membrane is made of plastic.

12. The tray of claim 1, wherein said securing means comprises two straps with attachable ends and fastening means of said ends allowing releasable interconnection thereof.

13. The tray of claim 1, wherein one of said side walls includes a bracket.

14. A travel tray comprising:

a) a generally rectangular bottom member having proximal and distal ends;

b) upstanding side walls surrounding a periphery of said bottom member and integrally attached thereto;

c) securing means extending continuously from said side walls for securing said tray about a waist of a user;

d) said securing means including a portion enclosing said proximal end of said bottom member and integrally attached to said side walls;

e) said bottom member and side walls having liquid repellent surfaces;

f) each of said bottom member and said side walls including a rigid member encapsulated with a liquid repellent plastic membrane, said membrane interconnecting said bottom member and side walls, said portion of said securing means being entirely made of said membrane;

g) said bottom member including a laterally extending hinge made of said membrane, said side walls lateral of said bottom member having respective hinges continuous with said bottom member hinge, and said side wall at the distal end of said bottom member having lateral extremities connected to said lateral side walls with gussets.

15. The tray of claim 14, wherein a proximal edge of said bottom member is arcuate.

16. The tray of claim 15, wherein said portion of said securing means is arcuate corresponding to said proximal edge.

17. The tray of claim 15, wherein said lateral side walls are being foldable over said bottom member with said distal side wall being foldable over said lateral side walls, said bottom member and side walls being subsequently foldable about said hinges to collapse said tray to a relatively small size for storage.

18. The tray of claim 14, wherein said securing means comprises two straps with attachable ends and fastening means on said ends allowing releasable interconnection thereof.

19. The tray of claim 14, wherein one of said side walls includes a bracket.

* * * * *